Aug. 22, 1961     J. WILLIAMS     2,996,935
INDEXING DEVICE

Filed Jan. 19, 1959     2 Sheets-Sheet 1

INVENTOR.
JOHN WILLIAMS

ATTORNEYS

Aug. 22, 1961     J. WILLIAMS     2,996,935
INDEXING DEVICE

Filed Jan. 19, 1959     2 Sheets-Sheet 2

INVENTOR.
JOHN WILLIAMS
ATTORNEYS

United States Patent Office 2,996,935
Patented Aug. 22, 1961

2,996,935
INDEXING DEVICE
John Williams, Utica, Mich., assignor to Holley Carburetor Company, Van Dyke, Mich., a corporation of Michigan
Filed Jan. 19, 1959, Ser. No. 787,587
6 Claims. (Cl. 74—816)

The present invention relates to an indexing device.

It is an object of the present invention to provide in a machine tool including relatively movable supports, indexing means operated automatically in response to relative movement between said supports.

More specifically, it is an object of the present invention to provide control mechanism in a machine tool including an indexably rotatable control device, a pair of relatively movable supports one of which carries said device, and camming mechanism carried in part by said device and in part by said other support.

It is a feature of the present invention to provide machine control mechanism comprising an indexably rotatable device, independently adjustable machine control members spaced circumferentially of said device and mounted thereon for independent adjustment longitudinally thereof, cam elements carried by said device, and cam actuating followers carried by said machine for effecting indexing rotation of said device.

More specifically, it is a feature of the present invention to provide mechanism as described in the preceding paragraph in which said cam means are shaped to be associated in gangs to effect predetermined multiple incremental rotation of said device.

Other objects and features of the invention will become apparent as the description proceeds, especially when taken in conjunction with the accompanying drawings, illustrating a preferred embodiment of the invention, wherein.

Figure 1:
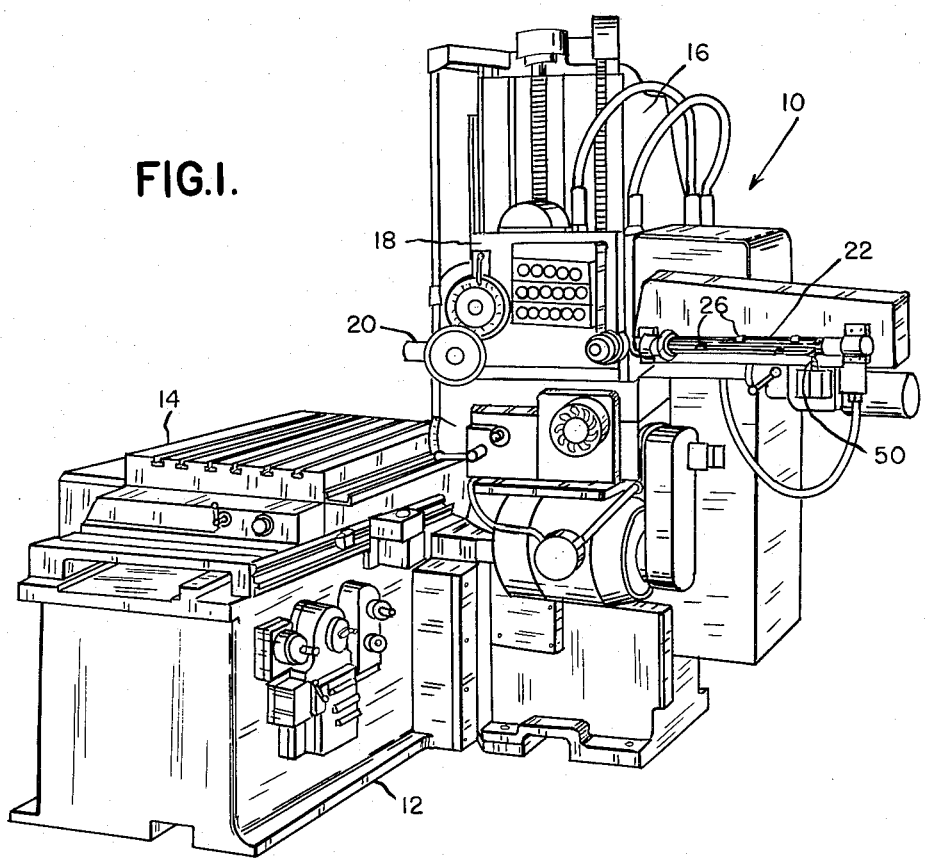
FIGURE 1 is a perspective view of a machine tool to which the present control mechanism is applied.
Figure 3:
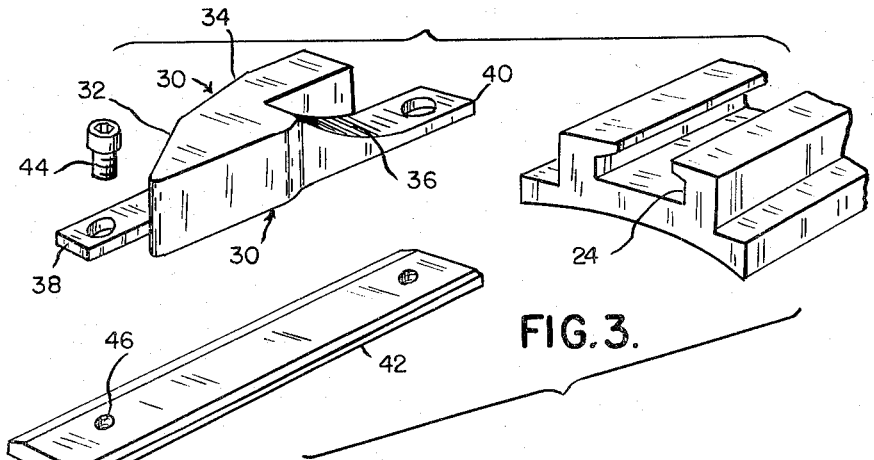
FIGURE 3 is an exploded view of the elements making up a portion of the indexing mechanism.

While the present invention is capable of a number of different applications, it is illustrated herein as associated with a machine tool 10 capable of performing boring and milling operations. Specifically, the machine comprises a base 12 having a work support 14 adjustably carried thereon and adapted to support a work piece. The base includes a column 16 carrying a vertically movable slide 18. A tool spindle 20 is carried by the slide 18 and is adapted to be driven in rotation and advanced axially to perform machining operations, typically, boring operations.

Where the machine is used on production it is provided with a rotatable turret bar 22 adapted to be rotated to a plurality of indexed positions such for example as twelve. The bar is provided with longitudinally extending grooves one of which is well illustrated in the exploded view of FIGURE 3 at 24. Adjustably positioned in the respective grooves are switch actuating stops 26, best seen in FIGURE 2. At each indexed position of the turret bar 22 one of these stops is in line with a switch actuating lever 28 and will engage the lever when the tool spindle has been advanced to exactly predetermined depth. The switch may of course be a control switch effective to stop and/or reverse movement of the tool.

Figure 2:
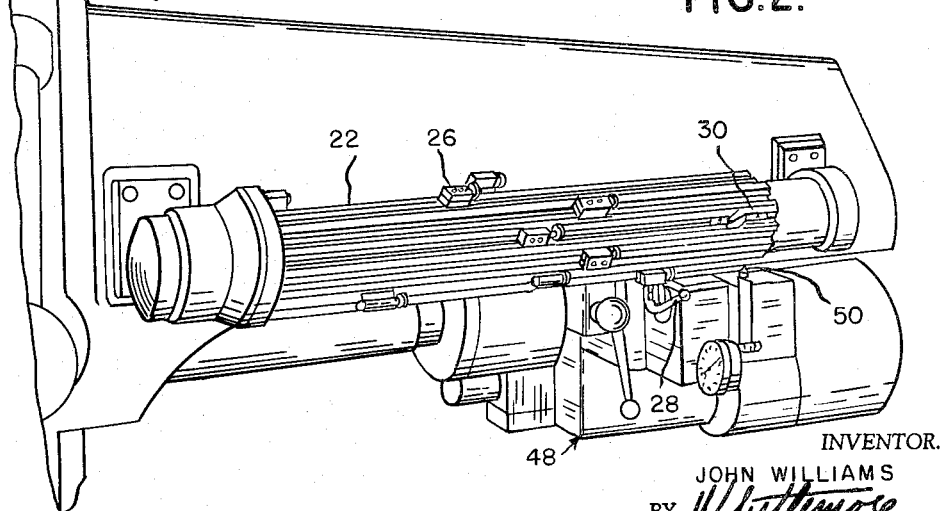
FIGURE 2 is an enlarged perspective view of the indexable control device.

In accordance with the present invention the rotating turret bar is also provided with a plurality of indexing cams one of which is shown at 30 in FIGURE 2, and shown in detail in FIGURES 3–6. The cam 30 has a pair of inclined camming surfaces 32 and 34 at one side thereof and is provided with a curved follower retracting surface 36. The cam 30 is provided with longitudinal extensions 38 and 40 adapted to be received on a flat support element 42 and attached thereto by screws indicated at 44. The screws may extend through threaded openings 46 in the plate or element 42 and thus effect clamping of the assembly of plate and cam in the turret bar grooves or slots 24.

Figure 5:
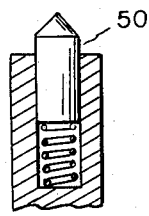
FIGURE 5 is a fragmentary sectional view of a cam follower associated with the indexing element.
Figure 4:
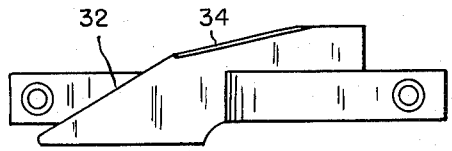
FIGURE 4 is a plan view of an indexing cam element.

Advance of the tool spindle is accompanied by advance of the associated driving structure indicated generally at 48 which includes a spring pressed follower 50, best seen in FIGURE 5, the location of which is however illustrated in FIGURE 2.

In the machining operation the tool support which includes the driving structure 48 advances to the left as seen in FIGURE 2, until a desired depth is reached at which time the switch lever 28 will engage the particular adjustable stop 26 which is in alignment therewith. Actuation of the switch controlled by the lever 28 will stop and/or reverse feeding advance of the tool and accordingly, the tool support structure 48 will return to the right. At this time the spring biased cam follower 50 will be in alignment with a particular cam 30 and will eventually sequentially engage the cam surfaces 32 and 34 thereof, thus effecting a predetermined indexed rotation of the turret bar 22. The turret bar 22 preferably is provided with resilient locator means such as a spring pressed ball movable into and out of circumferentially spaced detents so that the indexing movement performed by the cam 30 and cam follower 50 need be only approximate. When the tool support 48 again moves to the left, as seen in FIGURE 2, the spring pressed cam follower 50 will engage the follower retracting surface 36 of the next adjacent cam causing the cam follower to be depressed and ride up over the top of the cam. Accordingly, after the next succeeding feeding stroke of the tool support and its return movement, the spring pressed cam follower will engage the camming surface 32 of the next cam.

Figure 6:
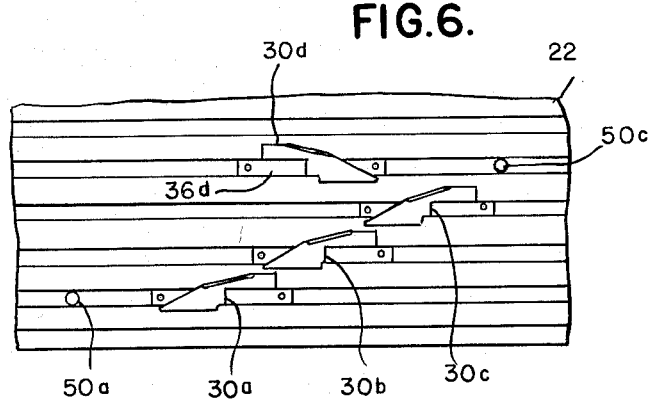
FIGURE 6 is a fragmentary developed view showing a group of cam elements on an indexably rotatable member.

In some cases it may be desirable to index the turret bar 22 by a plurality of incremental index rotations. This is readily accomplished by the present construction since a plurality of cams 30 may be ganged together as illustrated in FIGURE 6. In this figure the cams are designated 30a, 30b, 30c, and 30d for identification. If it is assumed that upon completion of a particular operation the cam follower 50 occupies the position indicated at 50a, it will be observed that movement of the tool support to the right, as seen in FIGURE 6, will cause the cam follower 50a to advance sequentially along the cam surfaces of the cams 30a, 30b, and 30c until it reaches a position indicated at 50c. If desired to obtain further indexing upon initiation of the next working stroke, the cam 30d may be reversed as shown in FIGURE 6 so that a further index rotation of the turret bar 22 follows from engagement of the cam follower with the camming surfaces. Alternatively of course, the cam shown at 30d may be reversed so that the cam follower rides up over the cam depressing inclined surface 36d thereof.

From the foregoing it will be noted that back and forth traverse of the tool support results in a predetermined incremental indexed rotation of the machine control turret bar so that each succeeding feeding traverse or stroke of the tool support may be to a different depth as illustrated by the precise adjustment of the adjustable stop 26 which is thus brought into alignment with the switch actuating lever 28.

The drawings and the foregoing specification constitute a description of the improved indexing device in such full, clear, concise and exact terms as to enable any person skilled in the art to practice the invention, the scope of which is indicated by the appended claims.

What I claim as my invention is:

1. Index means for a rotatable longitudinally slotted turret bar comprising a cam follower yieldable in a direction radial of said bar, a cam received in an elongated slot of said bar and adjustable longitudinally therein having a lateral inclined surface engageable by said follower upon relative traverse between said bar and follower in one direction longitudinally of said bar, and a top inclined surface engageable with said follower to cause it to yield upon relative traverse in the opposite direction.

2. Index means for a rotatable longitudinally slotted turret bar comprising a cam follower yieldable in a direction radial of said bar, a cam received in a slot of said bar having a lateral inclined surface engageable by said follower upon relative traverse between said bar and follower in one direction longitudinally of said bar, and a top inclined surface engageable with said follower to cause it to yield upon relative traverse in the opposite direction, said cam being reversible in said slot to cause index rotation of said bar to take place upon relative traverse between said bar and follower in either direction.

3. Index means for a rotatable longitudinally slotted turret bar comprising a cam follower yieldable in a direction radial of said bar, a cam received in a slot of said bar having a lateral inclined surface engageable by said follower upon relative traverse between said bar and follower in one direction longitudinally of said bar, and a top inclined surface engageable with said follower to cause it to yield upon relative traverse in the opposite direction, said cam having an effective camming width approximately equal to the spacing of adjacent slots so that a plurality of cams may be positioned in a longitudinally and circumferentially spaced relation to provide for rotation of said bar by a plurality of said cams in a single relative traverse stroke.

4. Index means for a rotatable turret bar having a plurality of equally spaced parallel axially extending slots formed therein, said index means comprising a cam follower mounted adjacent said bar for yielding radially of said bar, a cam having means slidably received in one of said slots to provide for adjustment of said cam longitudinally of said bar, clamping means for clamping said cam in fixed position on said bar, said cam having an inclined camming edge engageable by said follower upon relative traverse between said bar and follower in a direction longitudinal of said bar, said edge having a circumferential extent approximately equal to the spacing of said slots.

5. Index means for a rotatable turret bar having a plurality of equally spaced parallel axially extending slots formed therein, said index means comprising a cam follower mounted adjacent said bar for yielding radially of said bar, a cam having means slidably received in one of said slots to provide for adjustment of said cam longitudinally of said bar, clamping means for clamping said cam in fixed position on said bar, said cam having an inclined camming edge engageable by said follower upon relative traverse between said bar and follower in a direction longitudinal of said bar, said edge having a circumferential extent approximately equal to the spacing of said slots, a second cam mounted in the next adjacent slot and spaced longitudinally of the bar from the first mentioned cam whereby the cam follower will ride over the cam edges of both of said cams during a single stroke of relative traverse.

6. Index means for a rotatable turret bar having a plurality of equally spaced parallel axially extending slots formed therein, said index means comprising a cam follower mounted adjacent said bar for yielding radially of said bar, a cam having means slidably received in one of said slots to provide for adjustment of said cam longitudinally of said bar, clamping means for clamping said cam in fixed position on said bar, said cam having an inclined camming edge engageable by said follower upon relative traverse between said bar and follower in a direction longitudinal of said bar, said edge having a circumferential extent approximately equal to the spacing of said slots, said cam having a radially inclined surface disposed in substantial alignment with the forward end of the inclined cam edge thereof.

References Cited in the file of this patent

UNITED STATES PATENTS

| | | |
|---|---|---|
| 95,586 | Henderson | Oct. 5, 1869 |
| 2,005,822 | Burrell | June 25, 1935 |
| 2,346,352 | Su Baxell | Apr. 11, 1944 |
| 2,556,010 | Swanson | June 5, 1951 |
| 2,728,248 | De Vlieg | Dec. 27, 1955 |
| 2,776,584 | Burg | Jan. 8, 1957 |